United States Patent
Dobbelaar et al.

(10) Patent No.: US 6,209,552 B1
(45) Date of Patent: Apr. 3, 2001

(54) METHOD OF PREVENTING OR REDUCING FORMATION OF POLYMERIC DEPOSITS IN VESSELS DURING EMPTYING

(75) Inventors: Johannes Dobbelaar, Wachenheim; Gerd Rehmer, Beindersheim; Wolfgang Hümmer, Birkenheide; Reinhard Bächer, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/401,180

(22) Filed: Sep. 23, 1999

(30) Foreign Application Priority Data

Oct. 14, 1998 (DE) ............................................. 198 47 124

(51) Int. Cl.$^7$ ........................................................ B08B 9/08
(52) U.S. Cl. ................... 134/22.18; 134/22.1; 134/22.11; 134/22.12; 134/22.14; 134/22.15; 134/22.19; 134/30; 134/31; 134/34; 134/35; 134/36; 134/37; 134/39; 134/40; 134/42; 526/62
(58) Field of Search ................ 134/22.1, 22.11, 134/22.12, 22.14, 22.15, 22.19, 30, 22.18, 31, 34, 35, 36–37, 39–40, 42; 526/62

(56) References Cited

U.S. PATENT DOCUMENTS

| | | | |
|---|---|---|---|
| 4,220,480 | * 9/1980 | Dwass | 134/5 |
| 4,263,421 | * 4/1981 | Jones et al. | 526/62 |
| 4,732,784 | * 3/1988 | Laroche et al. | 427/230 |
| 5,698,045 | * 12/1997 | Walsh et al. | 134/12 |

OTHER PUBLICATIONS

Encyclopedia of Polymer Science and Engineering, John Wiley & Sons, vol. 12, p. 536,"Reactor Cleaning", 1988.*

* cited by examiner

*Primary Examiner*—S. Carrillo
(74) *Attorney, Agent, or Firm*—Oblon, Spivak, McClelland, Maier & Neustadt, P.C.

(57) ABSTRACT

A method of emptying vessels containing dispersions, solutions or suspensions of polymers in which during the emptying process the liquid medium also used to take up the polymers into the dispersion, solution or suspension is passed into the space within the vessel that is not filled by the solution, dispersion or suspension, wherein the liquid medium used to take up the polymers into the dispersion, solution or suspension is introduced in vapor form.

6 Claims, No Drawings

METHOD OF PREVENTING OR REDUCING FORMATION OF POLYMERIC DEPOSITS IN VESSELS DURING EMPTYING

The present invention relates to an improved method of emptying vessels containing dispersions, solutions or suspensions of polymers, in which during the emptying process the liquid medium also used to take up the polymers into the dispersion, solution or suspension is passed into the space within the vessel that is not filled by the dispersion, solution or suspension.

Processes of emptying dispersions, solutions and suspensions containing polymeric compounds are essential steps in both the production and processing of these dispersions, solutions or suspensions.

DESCRIPTION OF THE BACKGROUND

The general production and processing of polymer dispersions [cf. e.g. Encyclopedia of Polymer Science and Engineering, Vol. 8, p. 659ff. (1987); D. C. Blackley, in High Polymer Latices, Vol. 1, p. 35ff. (1966); Emulsion Polymerisation, Interscience Publishers, Inc. (1965), and Dispersionen synthetischer Hochpolymerer, F. Hölscher, Springer Verlag (1969) and also Ullmanns Encyclopädie der technischen Chemie, 4th ed., Vol. 19, p. 132ff.], polymer suspensions [cf. e.g. Encyclopedia of Polymer Science and Engineering, Vol. 16, p. 443ff. (1989); High Polymers, Vol. X, Polymer Processes, Interscience Publishers, Inc., p. 69ff. (1956); High Polymers, Vol. XXIX, Polymerization Processes, John Wiley & Sons, Inc., p. 106ff. (1977); Ullmanns Encyclopädie der technischen Chemie, 4. ed., Vol. 19, p. 125ff.] and polymer solutions [cf. e.g. Encyclopedia of Polymer Science and Engineering, Vol. 15, p. 402ff. (1989); High Polymers, Vol. X, Polymer Processes, Interscience Publishers, Inc., p. 175ff. (1956); High Polymers, Vol. XXIX, Polymerization Processes, John Wiley & Sons, Inc., p. 198ff. (1977); Ullmanns Encyclopädie der technischen Chemie, 4th ed., Vol. 19, p. 112ff.] have been described on many occasions in the past and are therefore sufficiently well known to the skilled worker.

The production of polymer dispersions, solutions and suspensions from the corresponding monomer units usually takes place continuously or batchwise in closed reactors. Depending on the monomer units used for the polymerization and the liquid medium used to take up the polymers, the reaction often takes place under an inert gas atmosphere, at elevated temperature, and, if desired, under superatmospheric pressure. After the end of the reaction and after the system has, if appropriate, been let down to atmospheric pressure, with recycling of the monomers, the contents of the reactor, which are often still at temperatures above 20° C., must be transferred from the reactor into a buffer, conditioning or storage container.

So that no subatmospheric pressure is formed within the reactor during the draining or pumping-off process, which would retard the emptying process, it has been suggested to "aerate" the reactor system during the emptying operation and so provide pressure compensation. By aeration (venting) here is meant a process in which the volume of liquid discharged from the reactor is matched by supplying precisely the same volume of inert gas or atmospheric air to the reactor per unit time under given pressure conditions. A similar procedure is adopted when emptying buffer, conditioning and storage containers or other vessels.

Disadvantages which have been found with the aeration of reactors and containers during the emptying process with inert gas or air, however, are that on the inner walls and internals of such vessels deposits and polymeric films of low solubility are formed which reduce the internal volume and run counter to the mode of action of the internals, such as stirrers, flow disruptors, sensors, valve closures, etc., and which act counter to heat transfer in the case of heat exchangers and heating or cooling coils. This means that the corresponding reactors, containers and tanks have to be subjected to extensive cleaning processes at frequent intervals and, furthermore, that it is necessary to cope with production downtime owing to the nonavailability of the units in question during the cleaning operations.

For avoiding deposits, Encyclopedia of Polymer Science and Engineering, Vol. 12, p. 536 (1988) describes spray jets which are permanently installed in the reactor head and from which, during the emptying process, a medium in liquid form is sprayed in as a cleaning fluid, said liquid medium being the same medium which comprises the polymers. Disadvantages which have been found with this technique are that the amount of spray agent required for cleaning undesirably dilutes the dispersion, solution or suspension discharged from the reactor, to a considerable extent, and that the degree of deposit prevention is unsatisfactory.

It is an object of the present invention to provide an improved method of emptying vessels containing dispersions, solutions or suspensions of polymers.

SUMMARY OF THE INVENTION

We have found that this object is achieved by a method of emptying vessels containing dispersions, solutions or suspensions of polymers in which during the emptying process the liquid medium also used to take up the polymers into the dispersion, solution or suspension is passed into the space within the vessel that is not filled by the solution, dispersion or suspension, wherein the liquid medium also used to take up the polymers into the dispersion, solution or suspension is introduced in vapor form.

DETAILED DESCRIPTION OF THE INVENTION

By vessels are meant reactors, stirred kettles, buffer containers and storage containers, transportation containers, drums, canisters and cans, etc. of a very wide variety of sizes and forms. The material from which the vessels are constructed is unimportant in this context. Use is made, for example, of a very wide variety of alloyed and unalloyed grade steels, chemically resistant stainless steel grades, such as 1.4541 and 1.4571 steels, and aluminum with or without a wide variety of internal coatings, such as enamel, silver, zinc and tin or plastics, examples being PTFE and lacquers, or plastics, examples being polyethylene, polypropylene, polystyrene, polyacrylamide, and glass fiber reinforced synthetic resins. These vessels may comprise a wide variety of different internals, examples being stirrers, heat exchangers, heating and/or cooling coils, flow disruptors and sensors, and also a wide variety of connections and openings, which may also be closable by way of closures, such as ballcocks, valves of various construction, and screw covers, etc.

Liquid media for taking up the polymers are suitably water, aliphatic and aromatic hydrocarbons, such as n-hexane, cyclohexane, benzene, toluene, ethylbenzene and cumene, alcohols, such as methanol, ethanol, n-propanol, 2-propanol, n-butanol, and 2-butanol, ketones, such as acetone and 2-butanone, aliphatic esters, such as ethyl acetate, halogenated hydrocarbons, such as dichloromethane, chloroform and carbon tetrachloride, but also other organic solvents or suitable mixtures of the abovementioned liquids. In the case of the polymer dispersions and suspensions preference is given to water; in the case of the polymer solutions, to said organic solvents.

The vapor of the liquid medium which also takes up the polymers is supplied to the vessels in the space not filled by the dispersion, solution or suspension, judiciously at a temperature which is the same as or higher than the boiling point of the liquid medium under the pressure conditions prevailing in the space within the vessels that is not filled by the dispersion, solution or suspension and is therefore higher than the temperature present in the space not filled by the dispersion, solution or suspension. The boiling points of the liquid media are material properties which are listed in reference works familiar to the skilled worker [(cf. e.g. Chemiker-Kalender, 3rd ed., Springer-Verlag (1984); D'Ans-Lax, Taschenbuch für Chemiker und Physiker, 4th ed. Vol. 2, Organische Verbindungen, Springer-Verlag (1983); CRC Handbook of Data on Organic Compounds, Vol. I and II, CRC Press, Inc. (1985) etc.]. The difference between the temperature of the space not filled by the dispersion, solution or suspension and the temperature of the vapor entering the vessel is usually >20° C., frequently >5° C., often >10° C., in many cases >20° C., and preferably >30° C.; alternatively, it may be even higher in value.

In general, operation takes place at atmospheric pressure (about 1 bar absolute) under an air or inert gas atmosphere in the space within the vessel that is not filled by the dispersion, solution or suspension. Alternatively, the method can be implemented at superatmospheric pressure, examples being 1.2 bar, 1.5 bar, 2 bar, 3 bar, 5 bar, or even higher absolute pressures. As a further alternative, it is possible to employ the method at subatmospheric pressure, such as 950 mbar, 900 mbar, 850 mbar, 800 mbar, or even lower absolute pressures. When operating with flammable liquid media it is advisable on safety grounds to ensure in principle that in any pressure range a sufficiently inert—that is, nonflammable and nonexplosive—atmosphere is ensured at all times within the vessel.

The pressure of the vapor of the liquid medium on introduction into the vessel is generally at least as high as the pressure prevailing in the space within the vessels that is not filled by the dispersion, solution or suspension. Preference is given, however, to using vapor whose pressure is higher than that prevailing in the space within the vessels that is not filled by the dispersion, solution or suspension. Generally speaking, the vapor is fed in by way of splashguard-equipped perforated plates, nozzles, etc. at the top of the vessels.

The vapor of the liquid medium is preferably supplied continuously but may also be supplied batchwise in one portion or in a plurality of portions. The amount of vapor supplied depends on the liquid medium, on the volume and the surface area of the space within the vessels that is not filled by the dispersion, solution or suspension, and on the temperature and pressure conditions prevailing therein, and is calculated such that there is continually an atmosphere at least saturated with liquid medium throughout the emptying process in the space not filled by the dispersion, solution or suspension.

The method of the invention prevents or reduces advantageously the formation of disruptive polymeric films and deposits when emptying vessels, in parallel to the emptying process, with no need for any further, downstream process steps. The method of the invention is easy to implement industrially, and its high efficiency with markedly increased plant utilization times results in only minimal dilution of the polymer-containing dispersions solutions or suspensions.

EXAMPLES

General Description

A insulated cylindrical 30 m$^3$ stirred container made from 1.4541 steel with a height-to-width ratio of 1.6 was provided with a four-stage MIG stirrer and, in the upper region of the container, with one product feed line and one connection each to the vacuum, aeration, rinsing-water and 4 bar steam system. The rinsing water was introduced by way of two impact nozzles (in each case one 10 mm nozzle with baffle, arranged diagonally opposite one another in the container lid). The 4 bar steam was fed in by way of a 1.5 mm perforated plate which was located behind a splash guard.

To fill the stirred container, 28 m$^3$ of a 2-ethylhexyl acrylate adhesive dispersion with a temperature of about 85° C., a solids content of 69% by weight, a pH of 4.5, and a viscosity of 350 mPas (determined in accordance with DIN 53019 at 23° C.) were introduced via the product feed line. The polymers of the 2-ethylhexyl acrylate adhesive dispersion contained more than 50% by weight of 2-ethylhexyl acrylate as their copolymerized units and had a glass transition temperature Tg of <0° C. To induce reaction of the residual monomers, the dispersion was treated in a conventional manner with an initiator system consisting of tert-butyl hydroperoxide and an acetone/bisulfite adduct, and the dispersion was stirred at a rotary speed of about 30 rpm without heating or cooling. Following reaction of the residual monomers, and after about one hour, the stirrer was switched off. After a further 10 minutes, and after the contents of the container had calmed, the bottom outlet valve was opened and the emptying pump was switched on. The following variants of emptying the dispersion (at about 80° to 85° C.) from the vessel were implemented:

1ST COMPARATIVE EXAMPLE

The aerating line was opened, so that during the emptying process external air with a pressure of about 1 bar (corresponding to the prevailing atmospheric pressure) and a temperature of 15° to 30° C. flowed in. Emptying of the stirred container took about 45 minutes. Following residueless emptying, the container was cleaned by spraying in a total of about 150 l of water at a temperature of 15° to 25° C. and a pressure of 5.5 bar through the two spray nozzles in the upper region of the container. Prior to subsequent filling, the container was evacuated to about 100 mbar (absolute).

After five filling, post-reaction, emptying and rinsing processes, the bottom region, stirring blades, the area around the aerating opening, and parts of the vertical container walls, bore a partially spongelike white deposit up to 10 mm thick.

2ND COMPARATIVE EXAMPLE

The aerating line was closed, so that during the emptying process no external air was able to flow in and a subatmospheric pressure of up to about 100 mbar (absolute) was established in the container. Emptying took about 60 to 75 minutes. Following residueless emptying, the container was cleaned by spraying in a total of about 150 l of water at a temperature of 15° to 25° C. and a pressure of 5.5 bar through the two spray nozzles in the upper region of the container. Subsequent filling took place directly into the container which was still subject to subatmospheric pressure.

After five filling, post-reaction, emptying and rinsing processes, the bottom region, stirring blades, and parts of the vertical container walls, bore a partially spongelike white deposit up to 10 mm thick.

3RD COMPARATIVE EXAMPLE

The aerating line was opened, so that during the emptying process external air with a pressure of about 1 bar (corresponding to the prevailing atmospheric pressure) and a temperature of 15° to 30° C. flowed in. In addition, about 15 l per minute of water at a temperature of 15° to 25° C. were sprayed in liquid form via the spray nozzles located in the lid region during the emptying process. Emptying of the stirred container took about 45 minutes.

Prior to subsequent filling, the container was evacuated to about 100 mbar (absolute).

After fifteen filling, post-reaction and emptying processes, the bottom region, bottommost stirring blades, the area around the aerating opening, and parts of the lower vertical container wall region, bore a partially spongelike white deposit up to 8 mm thick.

INVENTIVE EXAMPLE

With the aerating line closed, 4 bar steam at a temperature of about 140° C. was introduced continously during the emptying process by way of the 1.5 mm perforated plate located behind a splashguard in the upper region of the container. Emptying took about 60 to 75 minutes. During the emptying process, a pressure of about 100 mbar (absolute) became established in the container. Subsequent filling took place directly into the container which was still subject to subatmospheric pressure.

After thirty-five filling, post-reaction and emptying processes, the bottom region, bottommost stirring blades, and parts of the lower vertical wall region, bore a partially spongelike white deposit of up to 5 mm thick.

We claim:

1. A method of emptying a vessel containing a composition comprising a dispersion, a solution, or a suspension of a polymer in a liquid medium said method, comprising emptying the composition from the vessel, and during said emptying, introducing a vapor of said liquid medium in the space within the vessel not filled by said composition, wherein said vapor of said liquid medium reduces the formation of polymeric deposits in said vessel during emptying of said composition from said vessel.

2. The method as claimed in claim 1, wherein the vapor of said liquid medium is introduced into the vessel at a temperature higher than the temperature of the space within the vessel that is not filled by the composition.

3. The method as claimed in claim 1, wherein the vapor of said liquid medium is introduced into the vessel at a pressure higher than the pressure of the space within the vessel that is not filled by the composition.

4. The method as claimed in claim 1, wherein the vapor of said liquid medium is supplied continuously to the vessel.

5. The method as claimed in claim 1, wherein the vapor of said liquid medium is steam or an organic solvent vapor.

6. The method as claimed in claim 1, wherein the space within the vessel that is not filled by the composition is at a pressure selected from the group consisting of pressures greater than 1 bar, pressures less than 1 bar and pressures equal to 1 bar.

* * * * *